April 6, 1954     D. B. BANNERMAN, JR     2,674,218
HATCHWAY AND COVER
Filed Nov. 28, 1949
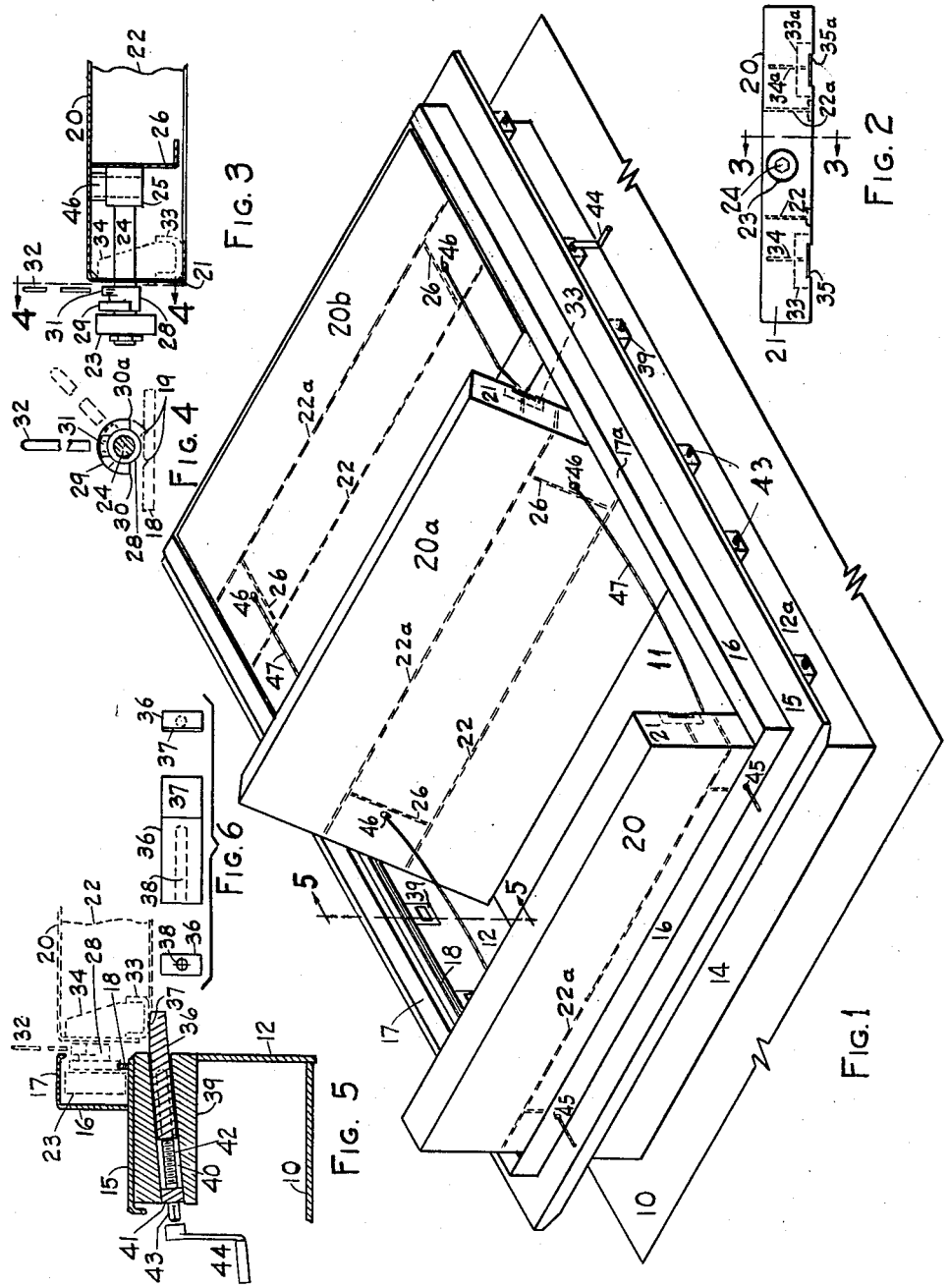

Patented Apr. 6, 1954

2,674,218

UNITED STATES PATENT OFFICE 2,674,218

HATCHWAY AND COVER

David B. Bannerman, Jr., Manhasset, N. Y.

Application November 28, 1949, Serial No. 129,756

3 Claims. (Cl. 114—202)

The present invention relates to new and useful improvements in hatch covers and securing means therefor, and more particularly to such improvements in connection with rolling pontoon types of hatch covers employed on merchant cargo vessels.

In general, the invention is concerned with hatch covers and novel mechanism for securing the same in position but more specifically to hatch covers particularly adapted for use with the hatchway openings on the shelter or weather decks of cargo vessels. In relatively large cargo vessels, access to the hold is provided through hatchways, usually large rectangular aligned openings through the weather deck and through the lower decks. These hatchways, particularly those on the weather deck, must usually be closed and must also be of very strong construction to guard against the pounding of heavy seas in inclement weather, and the like. However, it is also desirable to facilitate the application or removal of such hatch covers in the simplest possible manner and with a minimum of time when preparing for cargo loading or unloading.

There have been various suggested types of covers for closing these hatchways, particularly those through the weather deck and which include a coaming structure extending therearound and projecting above the deck surface. Often the coaming is outwardly stepped to provide a ledge for pontoon type covers which rest thereon when in closed position and which are usually covered with a tarpaulin for water tightness. Then, too, plain or rolling beams have been provided for such hatchways with cover planks extending thereacross and covered with a tarpaulin or the like. Rolling and tiltable pontoon covers have also been provided but, generally speaking, the hatch covers have been removed by deck or cargo gear and stowed on the deck which takes up needed working space on the deck and subjects the covers to the possibility of damage during cargo loading and unloading.

According to the present invention, and with the above in mind, one of the principal objects of this invention is to provide a hatch cover which can be moved between hatch opening and closing positions by simple manipulation without using cargo gear.

Another object of the invention is to provide a hatch cover which can be quickly operated without skilled knowledge on the part of the stevedores or seamen.

A further object of the invention is to provide a hatch cover which can be opened and closed without occupying deck space and without likelihood of damage during handling thereof.

A still further object of the invention is to provide a hatch cover having multiple sections which can be stowed within the confines of the hatchway when open.

A still further object of the invention is to provide a hatch cover having plural sections which are tiltable between horizontal and vertical positions and rollable along the coaming structure in which are incorporated retractable bars for supporting the several sections in horizontal hatch closing positions.

The invention still further aims to provide a hatch arrangement substantially of the above type wherein the operating and securing mechanisms are of simple and rugged construction and located so as to minimize the likelihood of damage thereto.

The above and other objects of the invention will in part be obvious and will be hereinafter more fully pointed out.

In the accompanying drawing wherein like reference numerals refer to like parts throughout the several views, Figure 1 is a fragmentary perspective view showing a single hatchway in the deck with the cover sections shown in various positions for purposes of illustration;

Figure 2 is an end view of one of the cover sections removed from the assembly;

Figure 3 is an enlarged fragmentary sectional view taken along the line 3—3 of Figure 2;

Figure 4 is a detail section taken along the line 4—4 of Figure 3 and showing one form of latching mechanism;

Figure 5 is an enlarged fragmentary section taken along the line 5—5 of Figure 1 and showing the relative positions of the retractable supporting bars and the cover sections when in closed positions, and Figure 6 constitutes detail end and plan views of one of the retractable bars.

Referring more in detail to the accompanying drawing, the weather deck surface of the ship is indicated generally by the numeral 10. It is to be understood, of course, that this deck 10 is provided with several hatchways but only one such opening 11 is shown. Surrounding the opening 11 and secured to the deck is a coaming framework including parallel side and end walls 12, 12a and 14, respectively, which project upwardly above the deck surface. A horizontal reinforcing flange 15 extends outwardly from and around the coaming and has upstanding therefrom a vertical flange 16 extending peripherally thereof but with the side portions offset outwardly with respect to the coaming sides 12, 12a and provided with inwardly directed horizontal flange portions 17, 17a along the tops thereof. The inner edges of the flange portions 17, 17a terminate above and substantially in vertical alignment with the sides 12, 12a of the coaming. Adjacent the inner edges of the horizontal flange 15, along the sides thereof, are guard rails 18, which are provided with notches 19 at predetermined points along the lengths thereof for purposes to be hereinafter pointed out. The surfaces of the flange 15 between the guard rails 18 and the vertical flange 16 afford supporting trackways for rollers on the cover sections to be described below.

In Figure 1, the hatch cover is shown with three cover sections 20, 20a, 20b, the description of one of which will be sufficient, but it is to be understood that in actual installations the hatch cover may include more of these cover sections, depending on the size of the hatch opening. These cover sections are usually of steel construction and as illustrated, include a top closing portion with a depending peripheral flange portion 21. Each cover may conveniently be strengthened by beams 22, 22a extending longitudinally thereof and secured thereto by welding or the like. In fact, all securing of the several parts is to be accomplished in any suitable manner, as by welding or the like.

Opposite ends of each cover section carry rollers 23 and as more particularly shown in Figure 3, these rollers are mounted on stub shafts 24 the axes of which are at the center of gravity of each cover. Each shaft extends through the adjacent depending flange 21 of the cover section and has the inner end thereof mounted in a bearing block 25 which is mounted on a transverse supporting beam 26 extending between the strengthening beams 22, 22a. The cover sections are of a length across the hatch opening 11 to approximate with slight clearance the distance between the sides 12, 12a of the coaming so that the cover sections can fit therebetween as shown. The rollers 23 project beyond the ends of the cover sections so as to travel along the supporting surfaces of the flange 15 beneath the inward flanges 17, 17a during movement of the cover sections between open and closed positions. The rollers 23 permit the cover sections to be turned to vertical positions within the hatchway as substantially shown by the position of the cover section 20 in Figure 1.

Between each of the rollers 23 and the adjacent cover flange, there is provided a latching mechanism which includes a sleeve 28 mounted on the shaft 24 and having an upstanding arcuate flange 29. The free ends 30, 30a of this flange 29 are adapted to engage one of the notches 19 in the guard rails 18. Thus, the sleeve has a socket 31 adapted to receive an operating handle 32 by which the sleeve 28 may be rotated to selective positions. In Figure 4, the dotted line position indicates clockwise rotation of the sleeve 28 so that the flange end 30a will engage a notch 19 in the guard rail to properly locate a cover section in the manner to be described hereinafter.

Each cover section is provided with wear plates 33, 33a at opposite ends thereof and these plates are disposed on opposite sides of the roller axis and exteriorly of the reinforcing beams as more particularly shown in Figure 2. The plates 33, 33a are substantially U-shaped in cross-section and are secured to stiffening brackets 34, 34a, respectively, which extend vertically of the cover section. The depending cover flange is recessed, as at 35, 35a, adjacent each wear plate in order to provide recesses or sockets forming keeper surfaces into which supporting bars (to be described below) are adapted to fit when supporting the cover sections in hatch closing positions.

The sides 12, 12a of the coaming are provided with spaced pairs or groups of retractable cover supporting bars 36 which are disposed symmetrically with respect to the wear plates when the cover sections are in closed positions. These bars and the mounting and operating means therefor are identical and the description of one will suffice, reference being had particularly to Figures 5 and 6 of the accompanying drawing. Each bar 36 is illustrated as being substantially rectangular in cross section with the upper surface 37 at the free inner end thereof being slightly beveled to provide a horizontal supporting surface adapted to contact the wear plates for supporting the cover sections. The opposite end of each bar is provided with an internally threaded aperture 38.

The coaming sides 12, 12a, at predetermined spaced intervals, are apertured to receive blocks 39 suitably secured thereto and to the flange 15. Each block 39 is provided with a rectangular aperture 40 therethrough for snugly receiving a supporting bar 36 for rectilinear movement therein. Each aperture 40 is inclined upwardly toward the top of the coaming walls so that the supporting surfaces 37 of each bar remain in substantially horizontal planes which are constantly urged upwardly as the bars are shifted inwardly of the hatchway. A fixed bearing block 41 closes the outer end of each aperture 40 and supports a bolt 42 against axial movement but for free rotation therein. Each bolt has a threaded shank which threadedly engages a corresponding recess 38 in a supporting bar and is provided at the outer end thereof with a squared or other non-circular end 43 adapted to be engaged by a crank 44 for rotating the bolt with resulting shifting of a corresponding supporting bar in either direction.

In general operation, it will be seen that when the cover sections 20, 20a, 20b are in horizontal edge to edge positions closing the hatch opening 11, the wear plates 33, 33a will be aligned with a corresponding supporting bar 36. The handle 32 may be inserted in the socket 31 to rotate the sleeve 28 in either direction for urging one of the flange ends 30, 30a into engagement with a corresponding notch 19 in the rail 18 to maintain the cover section in centered position with each of the keeper surfaces aligned with a corresponding bar 36, it being realized that each cover section is at this stage supported by the rollers 23 on the supporting surfaces of the flange 15. Either notch 19 may be used, depending upon the inclination of the deck. Thus, if the deck sheer is toward the right of Fig. 4, the right-hand notch would be employed to temporarily position the cover sections prior to projection of the supporting bars to secure the cover sections for sea. To secure the hatch for sea, a crank 44 is engaged with the accessible ends of the bolts 42 and manipulated to shift the bars 36 inwardly of the coaming. This brings the supporting surfaces 37 thereof into engagement with the wear plates 33, 33a and continued inward movement of the bars 36 will elevate each cover section and the rollers carried thereby so that each cover section is supported entirely on the bars 36 which are snugly engaged in the keeper recesses 35, 35a along the depending cover flanges to positively prevent movement thereof. When thus closed, the hatch covers are made watertight in the usual manner by the use of tarpaulins and battens.

To release the cover sections preparatory to opening the hatchways, the bars 36 are retracted to positions clear of the hatchway openings so that the cover sections are supported on the rollers 23. The cover sections may now be rotated ninety degrees to assume substantially vertical positions within the hatchway and then shifted to either end thereof in an accumulated group to permit loading and unloading through the hatchway. If desired, shifting of the cover sections when rotated to substantially vertical positions may be accomplished by reeving lines 47 through centrally disposed openings 46 in the bearing blocks and cover sections and holes 45 in the ends of the coaming flange 16, these openings being substantially aligned when the cover sections assume vertical positions within the coaming. The line may be stopped at the last cover section and tackle can be rigged for accumulating the cover sections at one end of the hatchway or for positioning the cover sections for closing regardless of the trim of the vessel or the sheer of the deck. In accumulated position, the latch sleeve 28 of the outermost cover section may be shifted to engage a notch 19 in the rail 18 to further assist in maintaining the group of cover sections in position.

From the foregoing description, it will be appreciated that the present invention provides a greatly simplified hatch cover arrangement wherein the cover sections are suported in sea position by retractable bars disposed thereunder and along the sides of the coaming. Retraction of the supporting bars permits the cover sections to rest on their supporting rollers and to be tilted to substantially vertical position and then rolled into position as an accumulated group at one end of the hatchway opening to permit cargo loading or unloading. Thus, no deck space is occupied by the hatch covers when the hatchways are open and the cover sections can be conveniently and easily shifted without employing cargo gear. The various operating parts of the assembly are located so as to minimize the likelihood of damage thereto. Thus, the rollers 23 are enclosed beneath the horizontal flange portions 17 and the several blocks 39 carrying the supporting bars 36 are disposed below the reinforcing flange portion 15. The space between the cover sections and the flange portions 17 is just sufficient to permit insertion of the handles 32 but otherwise there is not sufficient room for a tarpaulin to sag therein. In other words, there is a substantially even and flush top surface when the cover sections are in closed positions.

While one form of the invention has been shown and described herein for purposes of illustration, it is to be clearly understood that various changes in the details of construction and arrangement of parts may be accomplished without departing from the spirit and scope of the invention as set forth in the appended claims.

I claim:

1. In combination with a hatchway having a coaming structure with supporting surfaces along the sides thereof, a plurality of cover sections each having supporting rollers adapted to rest and travel on said supporting surfaces during movement of the cover sections between open and closed positions, supporting mechanisms spaced along the sides of the coaming structure and below the supporting surfaces for association with each cover section in closed position, each said supporting mechanism including a shiftable supporting bar transversely slidable relative to the coaming structure between an inoperative position clear of the hatchway opening and an operative position projecting into the hatchway opening, means connected to said bars for selectively shifting the same, and each said cover section having recessed keeper surfaces aligned with a corresponding supporting bar in closed position for receiving the projecting ends of said bars in operative positions thereof to prevent shifting of the cover sections.

2. The combination as claimed in claim 1, wherein the supporting bars are inclined upwardly and inwardly of the hatchway opening to elevate the respective cover sections and the associated rollers from the supporting surfaces as the bars are moved inwardly into engagement with the keeper surfaces.

3. In combination with a hatchway having a coaming structure with supporting surfaces along the sides thereof, a plurality of cover sections each having supporting rollers adapted to rest and travel on said supporting surfaces during movement of the cover sections between open and closed positions, supporting mechanisms spaced in pairs along the sides of the coaming structure and below the supporting surfaces for association with each cover section in closed position, each said supporting mechanism including a shiftable supporting bar transversely slidable relative to the coaming structure between an inoperative position of the hatchway opening and an operative position projecting into the hatchway opening, means connected to said bars for selectively shifting the same, each said cover section having keeper surfaces spaced on opposite sides of the axes of the supporting rollers in accordance with the spacing of the cooperating pair of supporting bars in closed position for receiving the projecting ends of said bars in the operative positions thereof to support the covers independently of the supporting rollers and thus prevent shifting thereof, shafts supporting the rollers on the cover sections, and shiftable latch means for engaging a part of the coaming structure to temporarily maintain the cover sections in position for receiving the ends of the supporting bars.

References Cited in the file of this patent

UNITED STATES PATENTS

| Number | Name | Date |
|---|---|---|
| 737,053 | Armstrong | Aug. 11, 1903 |
| 934,456 | McGray | Sept. 21, 1909 |
| 1,735,329 | MacGregor | Nov. 12, 1929 |
| 2,511,007 | Prehn | June 13, 1950 |
| 2,511,268 | Schiff | June 13, 1950 |

FOREIGN PATENTS

| Number | Country | Date |
|---|---|---|
| 523,560 | Great Britain | July 17, 1940 |